United States Patent
Sano

(10) Patent No.: US 6,876,385 B1
(45) Date of Patent: Apr. 5, 2005

(54) IMAGE DATA PROCESSING METHOD, IMAGE DATA PROCESSING APPARATUS AND DIGITAL STILL CAMERA

(75) Inventor: Chikako Sano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/379,072

(22) Filed: Aug. 23, 1999

(30) Foreign Application Priority Data

Aug. 24, 1998 (JP) .......................................... 10-237412

(51) Int. Cl.[7] .......................... H04N 5/76; G06K 9/40; G06K 9/32
(52) U.S. Cl. ............................. 348/231.6; 348/231.99; 348/420.1; 375/240.24; 382/254; 382/266; 382/268; 382/269; 382/298; 382/299
(58) Field of Search .................. 348/231.6, 231.99, 348/294, 420.1; 375/240.24; 382/254, 268, 269, 305, 266, 275, 298, 299

(56) References Cited

U.S. PATENT DOCUMENTS

| | | | | |
|---|---|---|---|---|
| 4,319,267 A | * | 3/1982 | Mitsuya et al. | 358/539 |
| 4,551,754 A | * | 11/1985 | Meise et al. | 348/434.1 |
| 4,694,404 A | * | 9/1987 | Meagher | 345/421 |
| 5,142,380 A | * | 8/1992 | Sakagami et al. | 382/250 |
| 5,159,666 A | * | 10/1992 | Fukuda et al. | 345/671 |
| 5,229,864 A | * | 7/1993 | Moronaga et al. | 382/261 |
| 5,262,853 A | * | 11/1993 | Nishino et al. | 348/488 |
| 5,298,990 A | * | 3/1994 | Otaka et al. | 375/240.24 |
| 5,337,088 A | * | 8/1994 | Honjo | 375/240.24 |
| 5,359,694 A | * | 10/1994 | Concordel | 358/445 |
| 5,369,447 A | * | 11/1994 | Soloff | 348/627 |
| 5,428,389 A | * | 6/1995 | Ito et al. | 348/231.6 |
| 5,561,617 A | * | 10/1996 | van der Wal | 708/308 |
| 5,594,736 A | * | 1/1997 | Tatsumi et al. | 370/474 |
| 5,856,849 A | * | 1/1999 | Aihara | 348/445 |
| 6,016,163 A | * | 1/2000 | Rodriguez et al. | 375/240.24 |
| 6,072,936 A | * | 6/2000 | Koyama | 386/95 |
| 6,188,804 B1 | * | 2/2001 | Weldy et al. | 382/300 |
| 6,360,018 B1 | * | 3/2002 | Nozawa | 382/248 |
| 6,426,771 B1 | * | 7/2002 | Kosugi | 348/222.1 |
| 6,501,799 B1 | * | 12/2002 | Kohn | 375/240.16 |
| 6,668,016 B1 | * | 12/2003 | Watanabe et al. | 375/240.12 |

FOREIGN PATENT DOCUMENTS

JP  09007309 A  *  1/1997  .......... G11B/20/12

* cited by examiner

*Primary Examiner*—Andrew Christensen
*Assistant Examiner*—Brian Genco
(74) *Attorney, Agent, or Firm*—Frommer Lawrence & Haug LLP; William S. Frommer; Dennis M. Smid

(57) ABSTRACT

This invention relates to an image data processing method or the like capable of obtaining a preferable reproduction image based on processed image data even if the image data is short of the unit of block on reading the image data from the memory means in the unit of block. When image data of "M lines×N pixels" written in a memory is read in a unit of block consisting of the predetermined number of pixels and the read image data is subjected to a compression coding process or the like, if data of two lines and data of four pixels per line are short, data of two pixels per line is added to the left end side of the image by using data (1,1) (2,1) ... (M,1) in the left end side thereof and data of two pixels is added to the right end side of the image by using data (1,N) (2,N) ... (M,N) in the right end side thereof. Data of one line is added to the upper end side of the image by using data (1,1) (1,2) ... (1,N) in the upper end side thereof and data of one line is added to the lower end side of the image by using data (M,1) (M,2) ... (M,N) in the lower end side thereof. Thus, an image data added part is inconspicuous, and deterioration in picture quality caused by a compressing and reduction in the data compression ratio can be prevented.

5 Claims, 3 Drawing Sheets

FIG. 2

| (1,1) | (1,2) | (1,3) | - - - - - - - - - - - - - - - - - - - | (1,N) |
|---|---|---|---|---|
| (2,1) | (2,2) | (2,3) | - - - - - - - - - - - - - - - - - - - | (2,N) |
| ⋮ | ⋮ | ⋮ | | ⋮ |
| (M,1) | (M,2) | (M,3) | - - - - - - - - - - - - - - - - - - - | (M,N) |

「N」 (columns), 「M」 (rows)

FIG. 3

| ADDED PART AD1 | | 「N」 | | | | ADDED PART AD4 | |
|---|---|---|---|---|---|---|---|
| (1,1) (1,1) | (1,1) | (1,2) | (1,3) | - - - - - - - - - - - - - | (1,N) | (1,N) (1,N) | ADDED PART AD2 |
| (1,1) (1,1) | (1,1) | (1,2) | (1,3) | - - - - - - - - - - - - - | (1,N) | (1,N) (1,N) | |
| (2,1) (2,1) | (2,1) | (2,2) | (2,3) | - - - - - - - - - - - - - | (2,N) | (2,N) (2,N) | |
| ⋮ | ⋮ | ⋮ | ⋮ | | ⋮ | ⋮ | 「M」 |
| (M,1) (M,1) | (M,1) | (M,2) | (M,3) | - - - - - - - - - - - - - | (M,N) | (M,N) (M,N) | |
| (M,1) (M,1) | (M,1) | (M,2) | (M,3) | - - - - - - - - - - - - - | (M,N) | (M,N) (M,N) | ADDED PART AD3 |

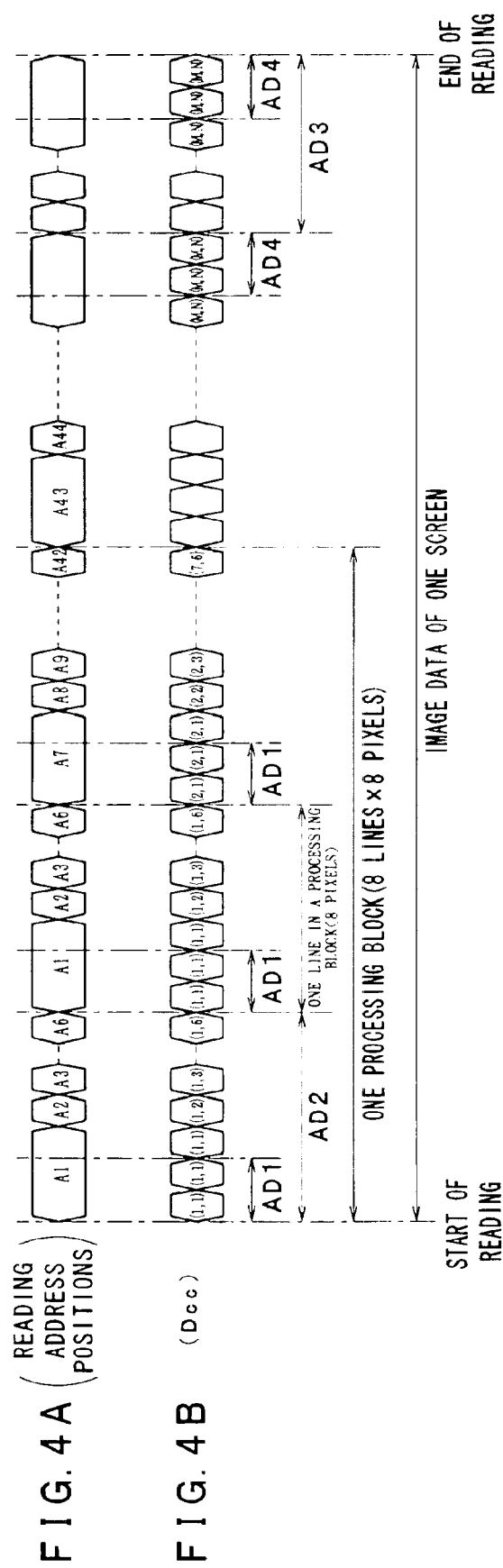

IMAGE DATA PROCESSING METHOD, IMAGE DATA PROCESSING APPARATUS AND DIGITAL STILL CAMERA

BACKGROUND OF THE INVENTION

The present invention relates to an image data processing method, an image data processing apparatus and a digital still camera. More particularly, the invention relates to an image data processing method or the like capable of obtaining a preferable reproduction image by storing image data of a screen into memory means, reading the image data from the memory means in a unit of block consisting of a predetermined number of pixels, performing compression coding process on the image data in the unit of block and, when the image data is short of the unit of block in being read in the unit of block, compensating a short amount thereof by using data on an end side of the image.

Conventionally, in recording image data on a recording medium, a format of the image data recorded on the recording medium is converted into a format of data that a reproducing apparatus can reproduce, and the resultant data is recorded.

For example, in case of recording image data obtained by photographing an object with a digital still camera on a memory card attached to the digital still camera, the image data is recorded on the memory card in a format such as JPEG (Joint Photographic Experts Group), FlashPix (format jointly developed by the four companies of Kodak, Hewlett-Packard, LivePicture, and Microsoft) in accordance with a data reproducing apparatus.

In the formats of JPEG, FlashPix and the like, image data is processed in a unit of block consisting of a predetermined number of pixels. For example, in the JPEG format, image data is processed in a unit of block of "8 pixels×8 pixels". In the FlashPix format, image data is processed in a unit of a block of "64 pixels×64 pixels". When a format of the image data obtained by a digital still camera is converted into the format of data such as JPEG and FlashPix, it is necessary to eliminate image data of excessive pixels or add image data to a short amount of pixels.

When image data of excessive pixels is eliminated, the size of a recorded image becomes smaller than that of the photographed image. When image data of a short amount of pixels is added, image data that has no relation with the photographed image is added. When the recorded image data is reproduced, the photographed image and also the image based on the added image data are displayed.

In case of performing a compression coding process on recording the image data to reduce the amount of data, if image data that is not related to the photographed image is added, not only the data compression ratio decreases but the picture quality of an image obtained by decompressing the compressed data deteriorates.

It is therefore an object of the invention to provide an image data processing method, an image data processing apparatus and a digital still camera, which can obtain a preferable image based on processed image data even if the image data is short of the unit of block when the image data is processed in the unit of block.

SUMMARY OF THE INVENTION

An image data processing method according to the invention, comprises the steps of storing image data of a screen into memory means, reading the image data from the memory means in a unit of block consisting of a predetermined number of pixels, processing the read image data in the unit of block, and, when the image data is read in the unit of block consisting of the predetermined number of pixels and the read image data is short of the unit of block, compensating a short amount thereof by using image data on an end side of an image from the image data stored in the memory means.

An image data processing apparatus according to the invention, comprises memory means for storing image data of a screen, memory control means for writing the image data on the memory means and reading the written image data in a unit of block, signal processing means for performing compression encoding process on the image data read from the memory means in the unit of block by the memory control means, and format setting means for supplying a setting signal indicative of a format used when the image data stored in the memory means is recorded on a recording medium, to the memory control means and the signal processing means, wherein the memory control means reads the image data from the memory means in a unit of block consisting of a predetermined number of pixels according to the format indicated by the setting signal from the format setting means and, when the image data is short of the unit of block on reading the image data, the memory control means repeatedly reads image data on an end side of an image from the image data stored in the memory means to compensate a short amount thereof.

A digital still camera according to the invention comprises means for converting an image signal obtained from an image pickup device into a digital image signal, memory means for storing image data of a screen of the digital image signal, memory control means for controlling the memory means so as to write image data on the memory means and read the written image data in a unit of block, signal processing means for performing compression coding process on the image data read from the memory means in the unit of block by the memory control means, and format setting means for supplying a setting signal indicative of a format used when the image data stored in the memory means is recorded on a recording medium, to the memory control means and the signal processing means.

In the digital still camera, the memory control means reads the image data from the memory means in a unit of block consisting of a predetermined number of pixels according to the format indicated by the setting signal from the format setting means and, when the image data is short of the unit of block on reading the image data, the memory control means repeatedly reads image data on an end side of an image from the image data of a screen stored in the memory means to thereby solve a short amount of image data.

Another digital still camera according to the invention comprises means for converting an image signal obtained from an image pickup device into a digital image signal, memory means for storing image data of at least a screen of the digital image signals, memory control means for controlling the memory means so as to write image data on the memory means and read the written image data in a unit of block having the number of pixels smaller than that of the image data of a screen, signal processing means for performing compression coding process on the image data read from the memory means in the unit of block by the memory control means, and format setting means for supplying a setting signal indicative of a format used when the image data stored in the memory means is recorded on a recording medium, to the memory control means and the signal processing means.

In this digital camera, the memory control means reads the image data as a plurality of blocks from the memory means in the unit of block consisting of the predetermined number of pixels according to the format indicated by the setting signal from the format setting means and, with respect to a predetermined block among the plurality of blocks, the memory control means forms a block by repeatedly reading image data on an end side of an image from the image data of a screen stored in the memory means.

In the invention, for example, image data of a screen obtained by photographing an object is written into memory means. In recording the image data written in the memory means on a recording medium, the image data is read in a unit of block consisting of a predetermined number of pixels according to a set format and the read image data is subjected to, for example, a compression coding process. When the image data is short of the unit of block on reading the image data in the unit of block, the short amount thereof is compensated by repeatedly reading image data on end sides of an image, and a compression coding process is performed in the unit of block consisting of the predetermined number of pixels. When image data of a plurality of pixels is short, respective image data on both of the end sides of the image is repeatedly used only the number of times which is almost the same with respect to each other and thereby the short amount thereof is compensated.

A further understanding of the nature and advantages of the invention may be realized by reference to the following portions of the specification and drawings.

BRIEF DESCRIPTION OF THE DRAWINGS

FIG. 2 is a diagram showing image data in a frame memory unit 20;

FIG. 3 is a diagram showing an image data adding method; and

FIGS. 4A and 4B are diagrams showing an operation of reading image data from the frame memory unit 20.

DESCRIPTION OF THE PREFERRED EMBODIMENT

Figure 1:
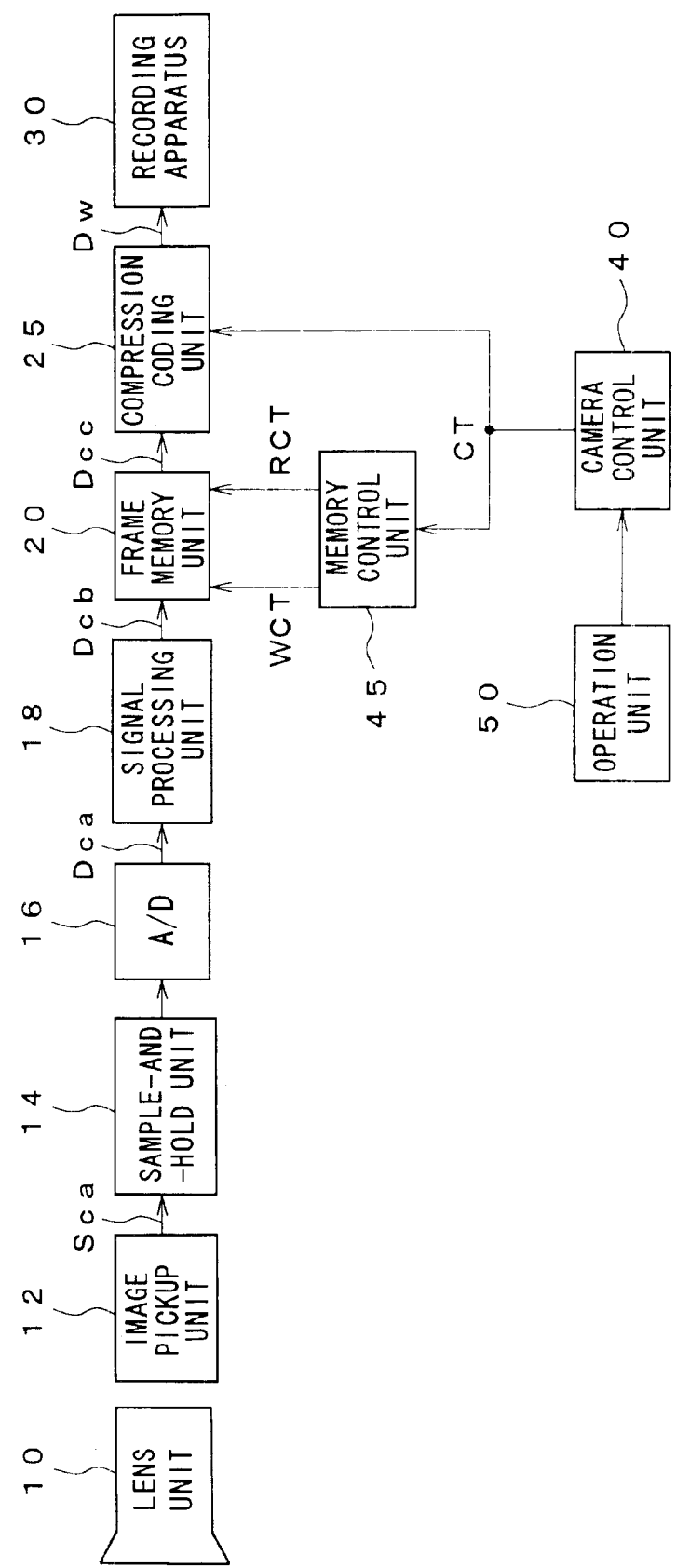
FIG. 1 is a diagram showing the construction of a digital still camera.

An embodiment of the invention will now be described more in detail with reference to the drawings. FIG. 1 shows the whole construction of an image pickup device, for example, a digital still camera.

Object light is supplied via a lens unit 10 to an image pickup unit 12 constructed by image pickup devices such as CCDs as photoelectric converters. Image pickup unit 12 generates an image pickup signal Sca based on the object light. After noise components are eliminated from the image pickup signal Sca by a sample-and-hold unit 14, the image pickup signal Sca is converted into image data Dca by an A/D converter 16, and the image data Dca is supplied to a signal processing unit 18.

The signal processing unit 18 performs a gamma process, a white balance adjustment, an outline correcting process, and the like on the image data Dca. The image data Dca subjected to the various processes in the signal processing unit 18 is supplied as image data Dcb to a frame memory unit 20.

A write control signal WCT and a read control signal RCT are supplied from a memory control unit 45, which will be described hereinafter, to the frame memory unit 20. On the basis of the write control signal WCT, the supplied image data Dcb is written. On the basis of the read control signal RCT, the image data Dcb written in the frame memory unit 20 is read. Image data Dcc read from the frame memory unit 20 is supplied to a compression processing unit 25.

An operation unit 50 is connected to a camera control unit 40. In the camera control unit 40, a control signal CT is generated according to an image data format set by the operation unit 50 on the basis of a signal SE from the operation unit 50 and is supplied to the compression processing unit 25 and the memory control unit 45.

In the memory control unit 45, on the basis of the control signal CT supplied from the camera control unit 40, the write control signal WCT for sequentially writing the image data Dcb from the signal processing unit 18 onto the frame memory unit 20 and the read control signal RCT for reading the image data in the unit of block in accordance with the set format are generated and supplied to the frame memory unit 20.

In the compression processing unit 25, on the basis of the control signal CT supplied from the camera control unit 40, the compression coding process is performed on the image data Dcc read from the frame memory unit 20 in accordance with the set format. The image data Dcc obtained by the compression coding process in the compression processing unit 25 is supplied as recording image data Dw to a recording apparatus 30 and is recorded on a recording medium such as a memory card.

When the image data is short of the unit of block on processing the image data according to the set format, the image data corresponding to the short amount thereof is added by controlling the reading order of the image data Dcc written in the frame memory unit 20.

FIG. 2 shows the image data Dcb of a photographed image of one frame written on the frame memory unit 20. It is assumed that the image data Dcb of one frame is composed of image data of "M lines×N pixels".

For simplicity of explanation, image data of the first pixel in the first line is indicated by (1,1) and image data of the first pixel in the second line is indicated by (2,1). Similarly, image data of the Nth pixel in the Mth line is indicated by (M,N) In FIG. 3, which will be described hereinafter, the image data is indicated in a similar manner.

In the case of performing compression coding on the image data Dcb in a unit of block of "K lines×L pixels" and recording the resultant data on the recording apparatus 30, when the number "M" of lines of the image data in the frame memory unit 20 is divided by the number "K" of lines of the block and there result in a remainder TA, the number of lines is added only by "K−TA" by repeatedly reading image data on end portions of the photographed image, that is, image data (1,1) (1,2) (1,3) . . . (1,N) and image data (M,1) (M,2) (M,3) . . . (M,N). Similarly, when the number "N" of pixels of one line in the image data in the frame memory unit 20 is divided by the number "L" of pixels of one line in the block and there result in a remainder TB, the number of pixels is added only by "L−TB" by repeatedly reading image data of the end portions on the photographed image, that is, image data (1,1) (2,1) . . . (M,1) and image data (1,N) (2,N) . . . (M,N). In such a manner, by adding the number of lines and the number of pixels, the image data can be processed in the unit of block, "K lines×L pixels".

FIG. 3 shows a method of adding image data in the case where the compression coding is performed on image data in the unit of block of, for example, "8 lines×8 pixels", when the number "M" of lines of the image data in the frame memory unit 20 is divided by the number "8" of lines in the block and there result in the remainder TA of 6, and when the number "N" of pixels one line in the image data in the frame memory unit 20 is divided by the number "8" of pixels per line in the block and there result in the remainder TB of 4.

As the remainder TA is 6, a process of adding image data of two lines to the image data in the frame memory unit 20 is performed. As the remainder TB is 4, a process of adding image data of four pixels to the image data per line in the image data in the frame memory unit 20 is executed.

Since the image data of a plurality of lines and image data of a plurality of pixels per line are to be added, image data of two pixels per line is added to the left end side of the photographed image by using the image data (1,1) (2,1) . . . (M,1) on the left end side of the image, and image data of two pixels per line is added to the right end side of the photographed image by using the image data (1,N) (2,N) . . . (M,N) on the right end side of the image. Further, the image data of one line is added to the upper end side of the photographed image by using the image data (1,1) (1,2) . . . (1,N) on the upper end side of the image, and the image data of one line is added to the lower end side of the photographed image by using the image data (M,1) (M,2) . . . (M,N) on the lower end side of the image. In such a manner, the short amount of the image data is compensated by repeatedly using respective image data on both end sides of the image only the number of times which is almost the same with respect to each other, so that the image can be prevented from being moved vertically or laterally by the addition of the image data.

FIG. 4 shows an operation when the reading of the image data Dcb written in the frame memory unit 20 is controlled and image data is added as shown in FIG. 3. FIG. 4A illustrates the reading address positions when the image data Dcb written in the frame memory unit 20 is read on the basis of the read control signal RCT. FIG. 4B illustrates the image data Dcc supplied from the frame memory unit 20 to the compression processing unit 25.

When the reading of the image data Dcb written in the frame memory unit 20 is started, the first reading address position "A1" of three pixels is held. Consequently, the image data (1,1) on the end side of the photographed image is read three times and image data of two pixels is added thereto. The image data of two pixels corresponds to an added part AD1 shown in FIG. 3. After that, by changing the reading address positions "A2" to "A6", image data of one line (8pixels) per one processing block is read.

The reading address position "A1" of three pixels is held again and then the reading address positions are changed to "A2" . . . "A6". Consequently, the image data (1,1) (1,1) . . . (1,6) of one line in the photographed image is read twice and image data of one line per one processing block is added. Incidentally, the image data of one line per one processing block that is read first, corresponds to an added part AD2 shown in FIG. 3.

After that, the reading address position of three pixels is held and then the reading address position is changed successively. When the reading address position comes to "A42", the image data Dcc of "8 lines×8 pixels" of one processing block can be obtained.

By reading the image data again at the reading address position when the image data of the Mth line is read, image data corresponding to an added part AD3 shown in FIG. 3 can be obtained. By holding the reading address position of three pixels upon reading of the image data of the Nth pixel, image data corresponding to an added part AD4 shown in FIG. 3 can be obtained.

As mentioned above, according to the above-mentioned embodiment, by adding the image data on the end sides of the photographed image to the parts to which the image data has to be added, the image data added part can be made inconspicuous when the image data that is compressed, coded and recorded is decompressed and reproduced, whereby a continuous image which seems to be normal can be displayed.

Since the image data addition is performed by using image data on the end sides of the photographed image, the correlation of image data in one processing block can be made strong. Thus, the data compression ratio can be prevented from reduction and the picture quality can be prevented from deterioration caused by the compression coding process.

Further, by controlling the reading of the image data from the frame memory unit 20, image data can be added by using image data on the end sides of the photographed image. It is therefore unnecessary to newly form image data for addition and hold the formed image data. The image data can be easily recorded on a recording medium in a desired format with a simple construction.

Although the case where image data obtained by photographing the object by a digital still camera is subjected to a compression coding has been described in the foregoing embodiments, the image data is not limited to image data of a photographed image. Obviously, the invention is not limited to the compression coding process but can be applied to a case where image data is read in a unit of block consisting of the predetermined number of pixels from the frame memory unit and processed.

According to the invention, when image data is short of the unit of block consisting of the predetermined number of pixels upon reading the image data in the unit of block from memory means, the short amount thereof is compensated by using the image data on the end sides of the image. It is, consequently, unnecessary to form image data for addition and hold the formed data, whereby an image in which the added part of the image data is inconspicuous can be obtained easily with a simple construction.

When the short image data corresponds to an amount of even-numbered pixels, respective image data on both end sides of the image is repeatedly used only the number of times which is almost the same with respect to each other. It can be therefore prevented that an image is moved vertically or laterally upon addition of image data.

Further, since a short amount is compensated by using image data on the end sides of an image and the image data is read in the unit of block consisting of the predetermined number of pixels according to the set format and is subjected to a compression coding in the unit of block, the data compression ratio can be prevented from reduction and the picture quality can be prevented from deterioration caused by a compression.

While the above is a complete description of the preferred embodiments of the invention, various alternatives, modifications and equivalents may be used. Therefore, the above description should not be taken as limiting the scope of the invention as defined by the appended claims.

What is claimed is:

1. An image data processing method comprising the steps of:
   storing image data of a screen into memory means, said image data having M lines and N pixels in each of said M lines;
   reading the image data from the memory means in a unit of block having K lines and L pixels in each of said K lines and processing the read image data in the unit of block; and when the image data is read in the unit of block having said K lines and said L pixels and the read image data is short of the unit of block, said M lines are divided by said K lines resulting in a first remainder and said N pixels are divided by said L pixels resulting in a second remainder;

wherein a number of lines equal to half of said first remainder is added to an upper end of said image, data and a lower end of said image data and wherein a number of pixels equal to half of said second remainder is added to a left end of said image data and a right end of said image data.

2. An image data processing apparatus comprising:

memory means for storing image data of a screen, said image data having M lines and N pixels in each of said M lines;

memory control means for writing the image data on the memory means and reading the written image data in a unit of block;

signal processing means for performing compression coding process on the image data read from the memory means in the unit of block by the memory control means; and format setting means for supplying a setting signal indicative of a format used when the image data stored in the memory means is recorded on a recording medium, to the memory control means and the signal processing means;

wherein the memory control means reads the image data from the memory means in a unit of block having K lines and L pixels in each of said K lines according to the format indicated by the setting signal from the format setting means and, when the image data is short of the unit of block on reading the image data, the memory control means divides said M lines by said K lines resulting in a first remainder and divides said N pixels by said L pixels resulting in a second remainder;

wherein a number of lines equal to half of said first remainder is added to an upper end of said image data and a lower end of said image data, and wherein a number of pixels equal to half of said second remainder is added to a left end of said image data and a right end of said image data.

3. An image data processing apparatus according to claim 2, wherein the signal processing means performs compression coding process according to the format indicated by the setting signal from the format setting means, on the image data read from the memory means in a unit of block.

4. A digital still camera comprising:

means for converting an image signal obtained from an image pickup device into a digital image signal;

memory means for storing image data of a screen of the digital image signal, said image data having M lines and N pixels in each of said M lines;

memory control means for controlling the memory means so as to write image data on the memory means and read the written image data in a unit of block;

signal processing means for performing compression coding process on the image data read from the memory means in the unit of block by the memory control means; and format setting means for supplying a setting signal indicative of a format used when the image data stored in the memory means is recorded on a recording medium, to the memory control means and the signal processing means;

wherein the memory control means reads the image data from the memory means in a unit of block consisting of having K lines and L pixels in each of said K lines according to the format indicated by the setting signal from the format setting means and, when the image data is short of the unit of block on reading the image data, the memory control means divides said M lines by said K lines resulting in a first remainder and divides said N pixels by said L pixels resulting in a second remainder;

wherein a number of lines equal to half of said first remainder is added to an upper end of said image data and a lower end of said image data, and wherein a number of pixels equal to half of said second remainder is added to a left end of said image data and a right end of said image data.

5. A digital still camera comprising:

means for converting an image signal obtained from an image pickup device into a digital image signal;

memory means for storing image data of at least a screen of the digital image signals, said image data having M lines and N pixels in each of said M lines;

memory control means for controlling the memory means so as to write image data on the memory means and read the written image data in a unit of block having K lines and L pixels in each of said K lines smaller than that of the image data of a screen;

signal processing means for performing compression coding process on the image data read from the memory means in the unit of block by the memory control means; and format setting means for supplying a setting signal indicative of a format used when the image data stored in the memory means is recorded on a recording medium, to the memory control means and the signal processing means;

wherein the memory control means reads the image data as a plurality of blocks from the memory means in the unit of block having said K lines and said L pixels according to the format indicated by the setting signal from the format setting means and, when the image data is short of the unit of block on reading the image data with respect to a predetermined block among the plurality of blocks, the memory control means divides said M lines by said K lines resulting in a first remainder and divides said N pixels by said L pixels resulting in a second remainder;

wherein a number of lines equal to half of said first remainder is added to an upper end of said image data a lower end of said image data, and wherein a number of pixels equal to half of said second remainder is added to a left end of said image data and a right end of said image data.

* * * * *